(12) United States Patent
Tao et al.

(10) Patent No.: US 12,385,783 B2
(45) Date of Patent: Aug. 12, 2025

(54) INFRARED RAMAN DEVICE

(71) Applicant: SHIMADZU CORPORATION, Kyoto (JP)

(72) Inventors: Tomoyo Tao, Kyoto (JP); Tomoki Sasayama, Kyoto (JP); Ryuta Shibutani, Kyoto (JP); Atsuhiko Otaguro, Kyoto (JP); Fumiya Katsutani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 127 days.

(21) Appl. No.: 18/520,342

(22) Filed: Nov. 27, 2023

(65) Prior Publication Data
US 2024/0175751 A1 May 30, 2024

(30) Foreign Application Priority Data
Nov. 30, 2022 (JP) .................... 2022-191431

(51) Int. Cl.
*G01J 3/44* (2006.01)
*G01J 3/02* (2006.01)
*G01J 3/10* (2006.01)

(52) U.S. Cl.
CPC ............... *G01J 3/44* (2013.01); *G01J 3/0202* (2013.01); *G01J 3/0208* (2013.01); *G01J 3/021* (2013.01); *G01J 3/108* (2013.01)

(58) Field of Classification Search
CPC .......... G01J 3/44; G01J 3/0202; G01J 3/0208; G01J 3/021; G01J 3/108; G01J 2003/106;
(Continued)

(56) References Cited

U.S. PATENT DOCUMENTS

2008/0304047 A1* 12/2008 Lee .................... G02B 21/0064
356/51
2015/0085098 A1 3/2015 Dowaki et al.
(Continued)

FOREIGN PATENT DOCUMENTS

| JP | 2015-025764 A | 2/2015 |
| JP | 6115562 B2 | 4/2017 |
| WO | 2013/132734 A1 | 9/2013 |

OTHER PUBLICATIONS

Extended European Search Report dated Apr. 19, 2024 in corresponding European Patent Application No. 23212522.9.

*Primary Examiner* — Abdullahi Nur
(74) *Attorney, Agent, or Firm* — Renner, Otto, Boisselle & Sklar, LLP (57) ABSTRACT

An infrared Raman device is capable of switching and performing Raman measurement and first infrared measurement on a sample. The infrared Raman device includes an objective lens for Raman measurement; a first observation lens for infrared measurement; a laser light source that generates laser light; a first infrared light source that generates first infrared light; and a mirror. The mirror is disposed at time of the Raman measurement to reflect the laser light to cause the laser light to pass through the objective lens for Raman measurement and reflect Raman light generated from the sample by the laser light that passes through the objective lens for Raman measurement and radiated to the sample. The Raman light passes back through the objective lens for Raman measurement.

4 Claims, 10 Drawing Sheets

(58) Field of Classification Search
CPC ...... G01J 3/28; G01J 3/36; G01J 3/42; G01N 21/65; G01N 21/35; G01N 2021/1736; G01N 21/01
See application file for complete search history.

(56) References Cited

U.S. PATENT DOCUMENTS

2019/0086260 A1* 3/2019 Zhang .................. G01J 3/0248
2022/0068681 A1* 3/2022 Han ....................... G01N 21/41
2023/0324303 A1* 10/2023 Antonelli ................. G01J 3/18
2025/0130164 A1* 4/2025 Sasayama ............. G01N 21/65

* cited by examiner

FIG.6B

INFRARED RAMAN DEVICE

CROSS REFERENCE TO RELATED APPLICATIONS

This nonprovisional application is based on Japanese Patent Application No. 2022-191431 filed on Nov. 30, 2022 with the Japan Patent Office, the entire contents of which are hereby incorporated by reference.

BACKGROUND OF THE INVENTION

Field of the Invention

The present disclosure relates to an infrared Raman device.

Description of the Background Art

For example, WO 2013/132734 describes a device that switches and performs Raman measurement and infrared measurement on a sample.

SUMMARY OF THE INVENTION

Some devices that switch and perform Raman measurement and infrared measurement on a sample may suffer from an increase in size around an objective optical system. In addition, such devices that switch and perform Raman measurement and infrared measurement on a sample may require positional adjustment of the sample in measurement mode switching.

The present disclosure has been made in view of the problems with the conventional technology as described above. More specifically, the present disclosure provides an infrared Raman device that is allowed to decrease in size around an objective optical system and perform measurement mode switching without having the position of a sample adjusted.

An infrared Raman device according to the present disclosure is capable of switching and performing Raman measurement and first infrared measurement on a sample. The infrared Raman device includes an objective lens for Raman measurement; a first observation lens for infrared measurement; a laser light source that generates laser light; a first infrared light source that generates first infrared light; and a mirror. The mirror is disposed at time of the Raman measurement to reflect the laser light to cause the laser light to pass through the objective lens for Raman measurement and reflect Raman light generated from the sample by the laser light that passes through the objective lens for Raman measurement and radiated to the sample. The Raman light passes back through the objective lens for Raman measurement. The objective lens for Raman measurement is switched to the first observation lens for infrared measurement at time of the first infrared measurement to cause an optical axis of the first observation lens for infrared measurement to coincide with an optical axis of the objective lens for Raman measurement at the time of the Raman measurement and the first observation lens for infrared measurement is used. The mirror is disposed at the time of the first infrared measurement to partially reflect the first infrared light to cause the first infrared light to pass through the first observation lens for infrared measurement and transmit the first infrared light that is reflected by the sample after passing through the first observation lens for infrared measurement and passes through the first observation lens for infrared measurement again.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present disclosure will be described with reference to the drawings. In the following drawings, the same or corresponding portions will be denoted by the same reference numerals and duplicate description will not be repeated.

First Embodiment

An infrared Raman device (that will be referred to as "infrared Raman device 100" below) according to a first embodiment will be described.

<Configuration of Infrared Raman Device 100>

The following describes a configuration of infrared Raman device 100.

Figure 1A:
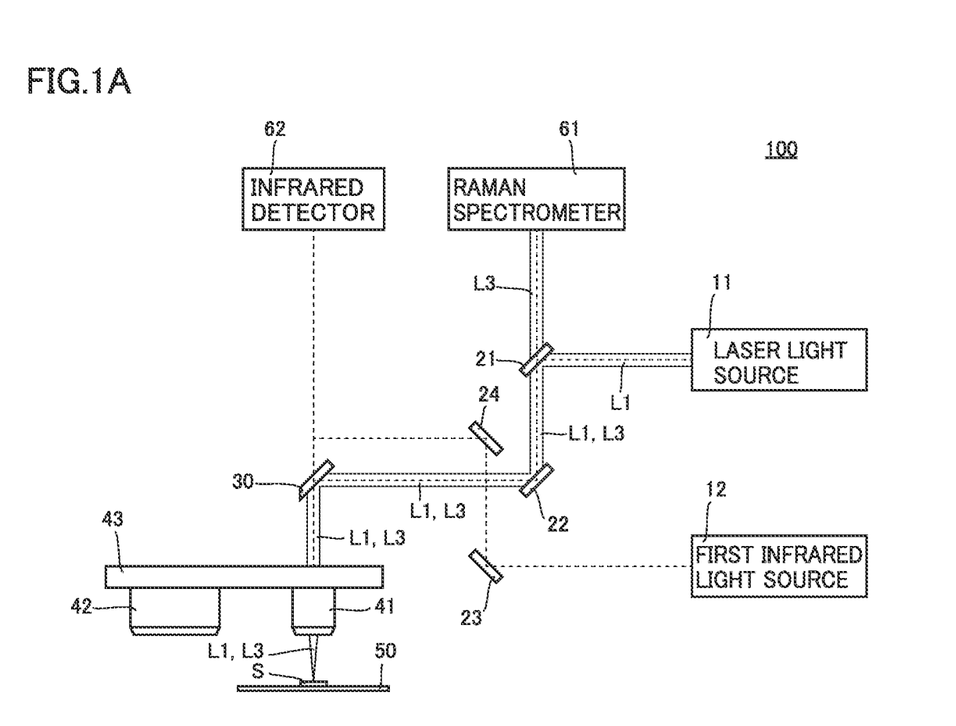
FIG. 1A is a schematic diagram of an infrared Raman device 100 at time of Raman measurement.
Figure 1B:
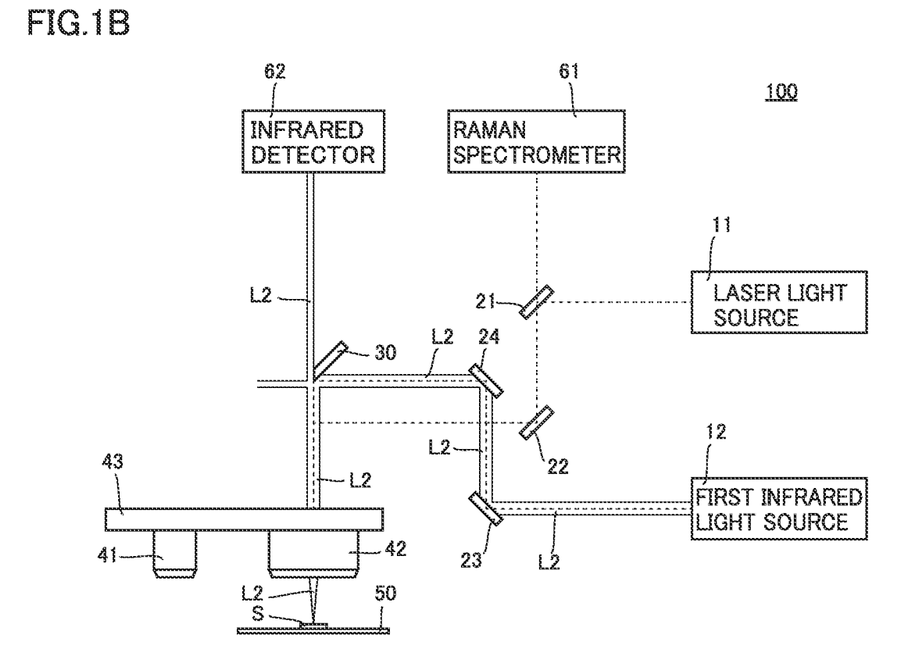
FIG. 1B is a schematic diagram of infrared Raman device 100 at time of first infrared measurement.

FIG. 1A is a schematic diagram of infrared Raman device 100 at the time of Raman measurement and FIG. 1B is a schematic diagram of infrared Raman device 100 at the time of first infrared measurement. As illustrated in FIGS. 1A and 1B, infrared Raman device 100 includes a laser light source 11, a first infrared light source 12, a beam splitter 21, a mirror 22, a mirror 23, a mirror 24, a mirror 30, an objective lens 41 for Raman measurement, a first observation lens 42 for infrared measurement, a revolving nosepiece 43, a stage 50, a Raman spectrometer 61, and an infrared detector 62.

Laser light source 11 generates laser light L1. First infrared light source 12 generates first infrared light L2. Infrared Raman device 100 is capable of switching and performing Raman measurement and first infrared measurement. Laser light L1 is used in the Raman measurement. First infrared light L2 is used in the first infrared measurement.

Objective lens 41 for Raman measurement and first observation lens 42 for infrared measurement are attached to revolving nosepiece 43. It is possible to switch objective lens 41 for Raman measurement and first observation lens 42 for infrared measurement by revolving revolving nosepiece 43. More specifically, revolving revolving nosepiece 43 at the time of first infrared measurement causes the optical axis of first observation lens 42 for infrared measurement to coincide with the optical axis of objective lens 41 for Raman measurement at the time of Raman measurement. Sample S is positioned on the optical axis of objective lens 41 for Raman measurement at the time of Raman measurement and the optical axis of first observation lens 42 for infrared measurement at the time of first infrared measurement. It is to be noted that sample S is disposed on stage 50.

Laser light L1 generated by laser light source 11 is reflected by beam splitter 21. Laser light L1 reflected by beam splitter 21 is reflected by mirror 22. First infrared light L2 generated by first infrared light source 12 is reflected by mirror 23. First infrared light L2 reflected by mirror 23 is reflected by mirror 24.

The position of mirror 30 is movable. Mirror 30 is, for example, an edge mirror. At the time of Raman measurement, mirror 30 is moved to a position at which the whole of laser light L1 reflected by mirror 22 is reflected. This causes laser light L1 reflected by mirror 30 to pass through objective lens 41 for Raman measurement. Laser light L1 passing through objective lens 41 for Raman measurement is condensed and radiated to sample S. The radiation of laser light L1 causes sample S to generate Raman light L3

Raman light L3 generated from sample S passes through objective lens 41 for Raman measurement. The whole of Raman light L3 that is collimated by passing through objective lens 41 for Raman measurement is reflected by mirror 30. Raman light L3 reflected by mirror 30 is reflected by mirror 22. Raman light L3 reflected by mirror 22 passes through beam splitter 21. Raman light L3 passing through beam splitter 21 enters Raman spectrometer 61. This causes Raman spectrometer 61 to perform Raman measurement.

At the time of first infrared measurement, objective lens 41 for Raman measurement is switched to first observation lens 42 for infrared measurement by revolving revolving nosepiece 43. In addition, the position of mirror 30 is moved at the time of first infrared measurement. More specifically, at the time of first infrared measurement, mirror 30 is moved to a position at which a portion of first infrared light L2 reflected by mirror 24 is reflected. This causes first infrared light L2 reflected by mirror 30 to pass through first observation lens 42 for infrared measurement. First infrared light L2 passing through first observation lens 42 for infrared measurement is condensed and radiated to sample S.

First infrared light L2 reflected by sample S passes through first observation lens 42 for infrared measurement. First infrared light L2 that is collimated by passing through first observation lens 42 for infrared measurement passes through mirror 30. In other words, first infrared light L2 that is reflected by sample S and passes through first observation lens 42 for infrared measurement is not reflected by mirror 30. First infrared light L2 passing through mirror 30 enters infrared detector 62. This causes infrared detector 62 to perform first infrared measurement.

Figure 2:
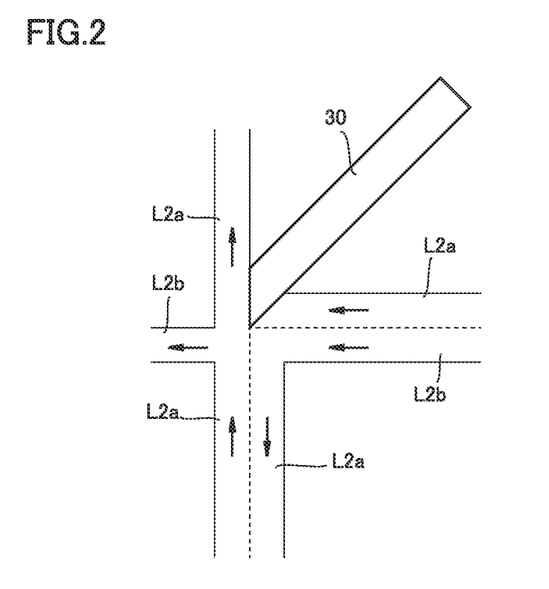
FIG. 2 is an enlarged schematic view of a region near a mirror 30 at the time of the first infrared measurement.

FIG. 2 is an enlarged schematic view of a region near mirror 30 at the time of the first infrared measurement. As illustrated in FIG. 2, first infrared light L2 reflected by mirror 24 has a first portion L2a and a second portion L2b. First portion L2a is reflected by mirror 30, but second portion L2b passes through mirror 30 instead of being reflected by mirror 30. It is to be noted that second portion L2b passing through mirror 30 is absorbed by an appropriate method though not illustrated. This prevents second portion L2b from being stray light.

Figure 3A:
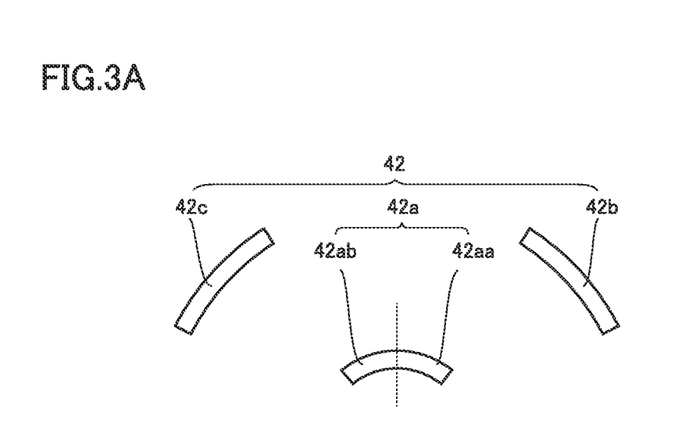
FIG. 3A is a schematic diagram of a first observation lens 42 for infrared measurement.

FIG. 3A is a schematic diagram of first observation lens 42 for infrared measurement. As illustrated in FIG. 3A, first observation lens 42 for infrared measurement includes an aspherical mirror 42a and spherical mirrors 42b and 42c. Spherical mirror 42b is disposed to be symmetrical to spherical mirror 42c with respect to the position of the middle (see the dotted line in FIG. 3A) of aspherical mirror 42a in the direction orthogonal to the optical axis of first observation lens 42 for infrared measurement.

Aspherical mirror 42a has a first portion 42aa and a second portion 42ab. First portion 42aa is closer to spherical mirror 42b than the position of the middle of aspherical mirror 42a in the direction orthogonal to the optical axis of first observation lens 42 for infrared measurement. Second portion 42ab is closer to spherical mirror 42c than the position of the middle of aspherical mirror 42a in the direction orthogonal to the optical axis of first observation lens 42 for infrared measurement.

Figure 3B:
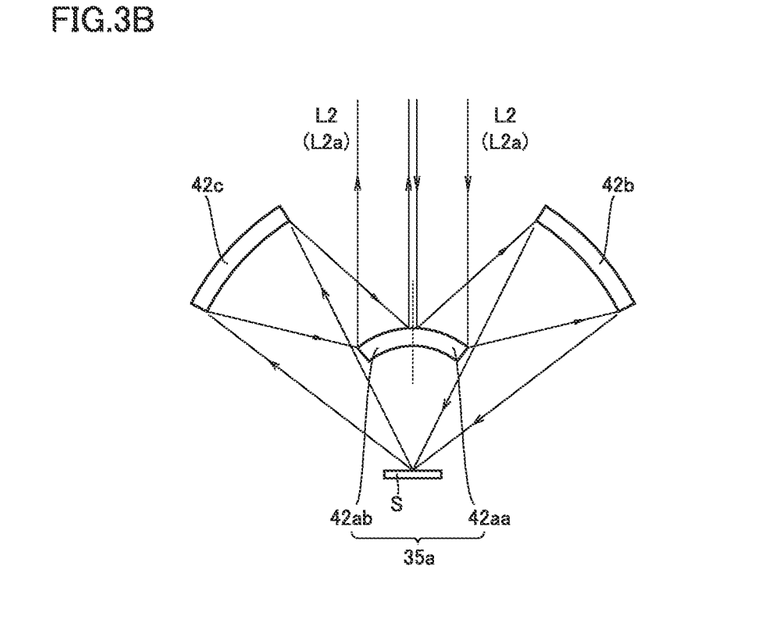
FIG. 3B is a schematic diagram illustrating that first infrared light L2 passes through first observation lens 42 for infrared measurement.

FIG. 3B is a schematic diagram illustrating that first infrared light L2 passes through first observation lens 42 for infrared measurement. As illustrated in FIG. 3B, first infrared light L2 (first portion L2a) entering first observation lens 42 for infrared measurement is reflected by only first portion 42aa. First infrared light L2 reflected by first portion 42aa is reflected by spherical mirror 42b to be condensed on sample S. First infrared light L2 reflected by sample S is sequentially reflected and collimated by spherical mirror 42c and second portion 42ab. In this way, first infrared light L2 reflected by second portion 42ab passes through an optical path different from that of first infrared light L2 that enters first observation lens 42 for infrared measurement. First infrared light L2 that is reflected by sample S and passes through first observation lens 42 for infrared measurement thus passes through mirror 30 instead of being reflected by mirror 30.

<Effect of Infrared Raman Device 100>

The following describes an effect of infrared Raman device 100 in comparison with that of an infrared Raman device (that will be referred to as "infrared Raman device 200" below) according to a comparative example.

Figure 4A:
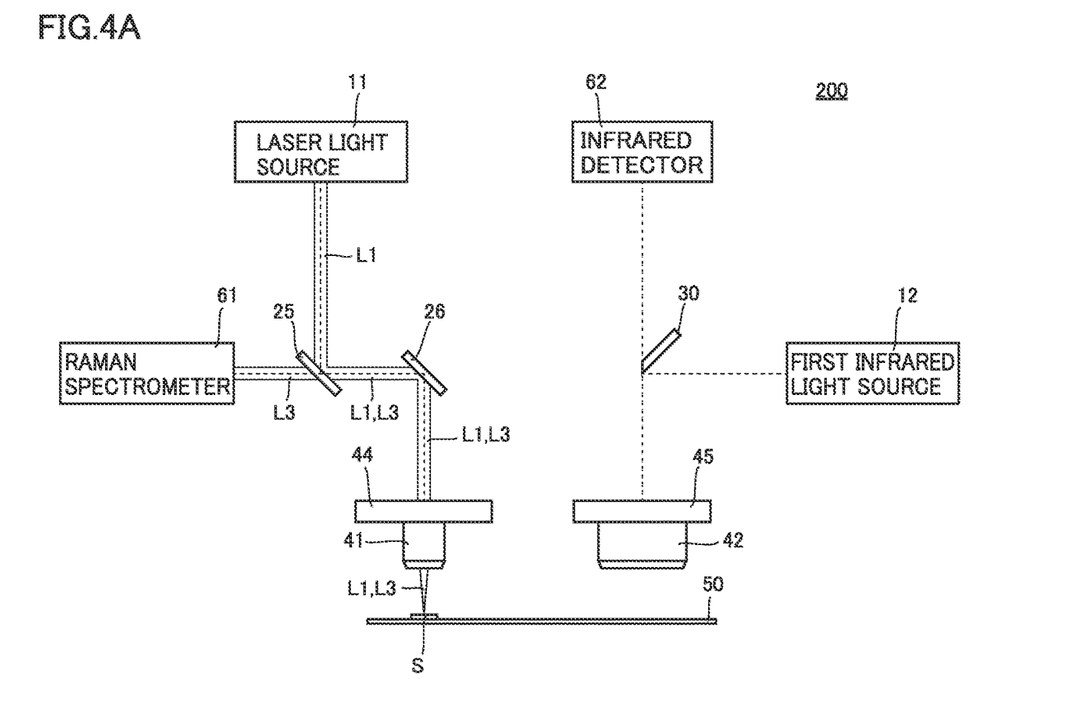
FIG. 4A is a schematic diagram of an infrared Raman device 200 at the time of the Raman measurement.
Figure 4B:
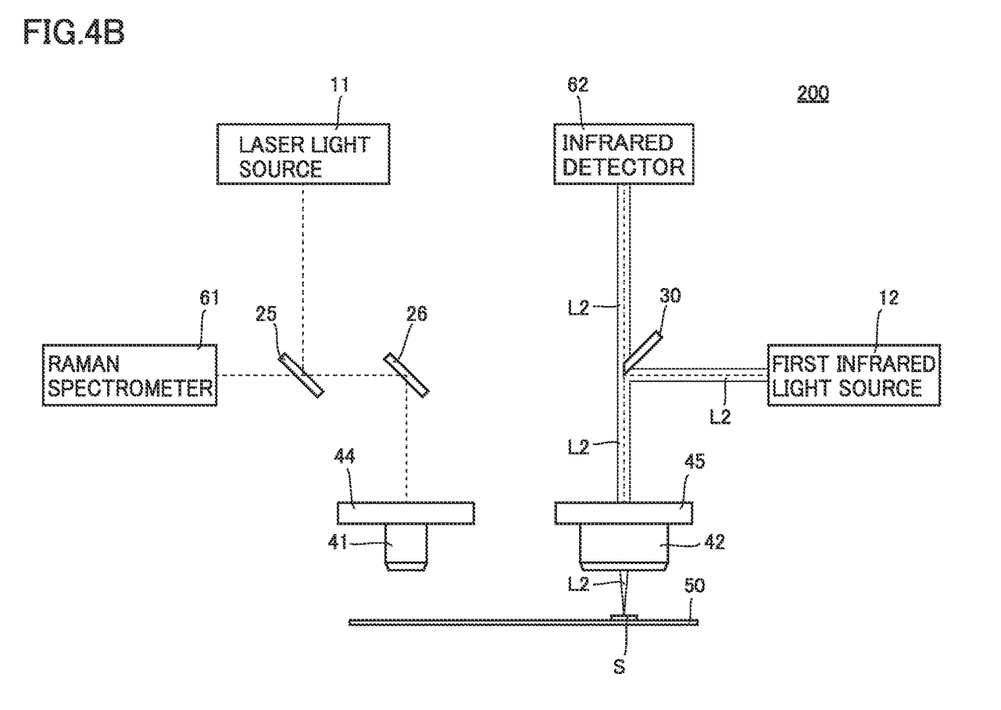
FIG. 4B is a schematic diagram of infrared Raman device 200 at the time of the first infrared measurement.

FIG. 4A is a schematic diagram of infrared Raman device 200 at the time of Raman measurement and FIG. 4B is a schematic diagram of infrared Raman device 200 at the time of first infrared measurement. As illustrated in FIGS. 4A and 4B, infrared Raman device 200 includes laser light source 11, first infrared light source 12, a beam splitter 25, a mirror 26, mirror 30, objective lens 41 for Raman measurement, first observation lens 42 for infrared measurement, a revolving nosepiece 44, a revolving nosepiece 45, stage 50, Raman spectrometer 61, and infrared detector 62. Infrared Raman device 200 is capable of switching and performing Raman measurement and first infrared measurement.

In infrared Raman device 200, laser light L1 generated by laser light source 11 is sequentially reflected by beam splitter 25 and mirror 26, passes through objective lens 41 for Raman measurement, and radiated to sample S at the time of Raman measurement. In infrared Raman device 200, Raman light L3 generated from sample S passes through objective lens 41 for Raman measurement, is reflected by mirror 26, and then passes through beam splitter 25 to enter Raman spectrometer 61 at the time of Raman measurement.

In infrared Raman device 200, first infrared light L2 generated by first infrared light source 12 is partially reflected by mirror 30 and first infrared light L2 reflected by mirror 30, passes through first observation lens 42 for infrared measurement, and radiated to sample S at the time of first infrared measurement. In infrared Raman device 200, first infrared light L2 reflected by sample S sequentially passes through first observation lens 42 for infrared measurement and mirror 30 to enter infrared detector 62 at the time of first infrared measurement. In this way, mirror 30 is used in infrared Raman device 200 only at the time of first infrared measurement.

In infrared Raman device 200, objective lens 41 for Raman measurement and first observation lens 42 for infrared measurement are respectively attached to revolving nosepiece 44 and revolving nosepiece 45. The optical axis of objective lens 41 for Raman measurement at the time of Raman measurement does not thus coincide with the optical axis of first observation lens 42 for infrared measurement at the time of first infrared measurement. This makes it necessary to adjust the position of sample S at the time of Raman measurement and at the time of first infrared measurement. In addition, mirror 30 is used in infrared Raman device 200 only at the time of first infrared measurement. A different mirror (mirror 26) is used around the objective optical system at the time of Raman measurement. This causes an increase in size around the objective optical system.

In contrast, objective lens 41 for Raman measurement and first observation lens 42 for infrared measurement are attached to one revolving nosepiece (revolving nosepiece 43) in infrared Raman device 100. Revolving the one revolving nosepiece makes it possible to cause the optical axis of first observation lens 42 for infrared measurement at the time of first infrared measurement to coincide with the optical axis of objective lens 41 for Raman measurement at the time of Raman measurement. This makes it unnecessary to adjust the position of sample S at the time of Raman measurement and at the time of first infrared measurement. In addition, mirror 30 is used in infrared Raman device 100 both at the time of Raman measurement and at the time of first infrared measurement. This allows for a decrease in size around the objective optical system.

Second Embodiment

An infrared Raman device (that will be referred to as "infrared Raman device 100A" below) according to a second embodiment will be described. A difference from infrared Raman device 100 will be chiefly described here and duplicate description will not be repeated.

<Configuration of Infrared Raman Device 100A>

The following describes a configuration of infrared Raman device 100A.

Figure 5:
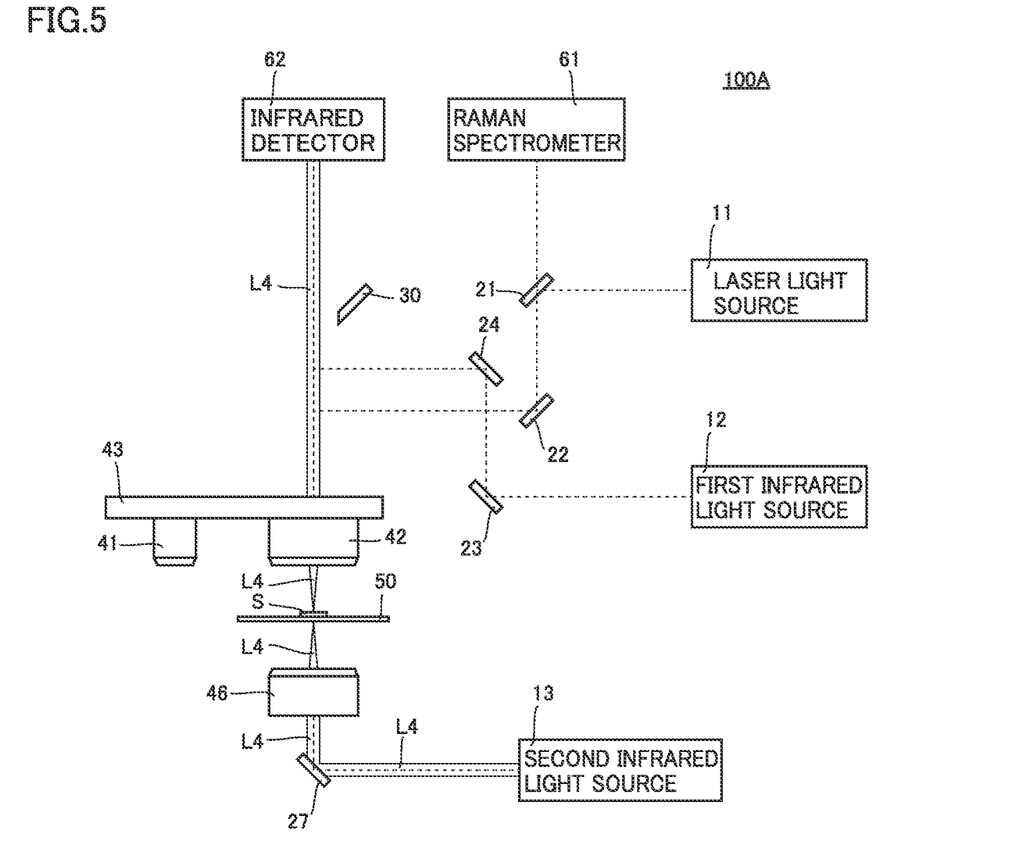
FIG. 5 is a schematic diagram of an infrared Raman device 100A at time of second infrared measurement.

FIG. 5 is a schematic diagram of infrared Raman device 100A at the time of second infrared measurement. As illustrated in FIG. 5, infrared Raman device 100A includes laser light source 11, first infrared light source 12, beam splitter 21, mirror 22, mirror 23, mirror 24, mirror 30, objective lens 41 for Raman measurement, first observation lens 42 for infrared measurement, revolving nosepiece 43, stage 50, Raman spectrometer 61, and infrared detector 62. In this respect, the configuration of infrared Raman device 100A is the same as the configuration of infrared Raman device 100.

Infrared Raman device 100A is capable of switching and performing not only Raman measurement and first infrared measurement, but also second infrared measurement in which second infrared light L4 is used. Infrared Raman device 100A further includes a second infrared light source 13, a mirror 27, and a second observation lens 46 for infrared measurement.

Second infrared light source 13 generates second infrared light L4. Second infrared light L4 generated by second infrared light source 13 is reflected by mirror 27. In infrared Raman device 100A, revolving nosepiece 43 is revolved at the time of second infrared measurement to cause the optical axis of first observation lens 42 for infrared measurement to coincide with the optical axis of objective lens 41 for Raman measurement at the time of Raman measurement. At the time of second infrared measurement, the optical axis of second observation lens 46 for infrared measurement coincides with the optical axis of first observation lens 42 for infrared measurement.

Second infrared light L4 reflected by mirror 27 passes through second observation lens 46 for infrared measurement and is condensed and radiated to sample S. At this time, second infrared light L4 passes through stage 50. Second infrared light L4 passing through sample S is collimated by passing through first observation lens 42 for infrared measurement.

Figure 6A:
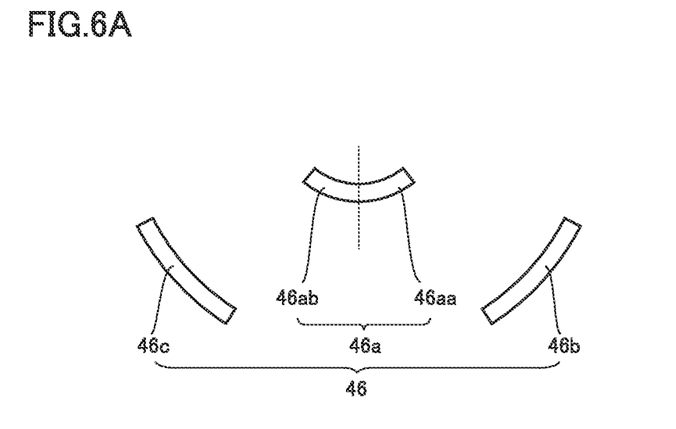
FIG. 6A is a schematic diagram of a second observation lens 46 for infrared measurement.

FIG. 6A is a schematic diagram of second observation lens 46 for infrared measurement. As illustrated in FIG. 6A, second observation lens 46 for infrared measurement includes an aspherical mirror 46a and spherical mirrors 46b and 46c. Spherical mirror 46b is disposed to be symmetrical to spherical mirror 46c with respect to the position of the middle (see the dotted line in FIG. 6A) of aspherical mirror 46a in the direction orthogonal to the optical axis of second observation lens 46 for infrared measurement.

Aspherical mirror 46a has a first portion 46aa and a second portion 46ab. First portion 46aa is closer to spherical mirror 46b than the position of the middle of aspherical mirror 46a in the direction orthogonal to the optical axis of second observation lens 46 for infrared measurement. Second portion 46ab is closer to spherical mirror 46c than the position of the middle of aspherical mirror 46a in the direction orthogonal to the optical axis of second observation lens 46 for infrared measurement.

Figure 6B:
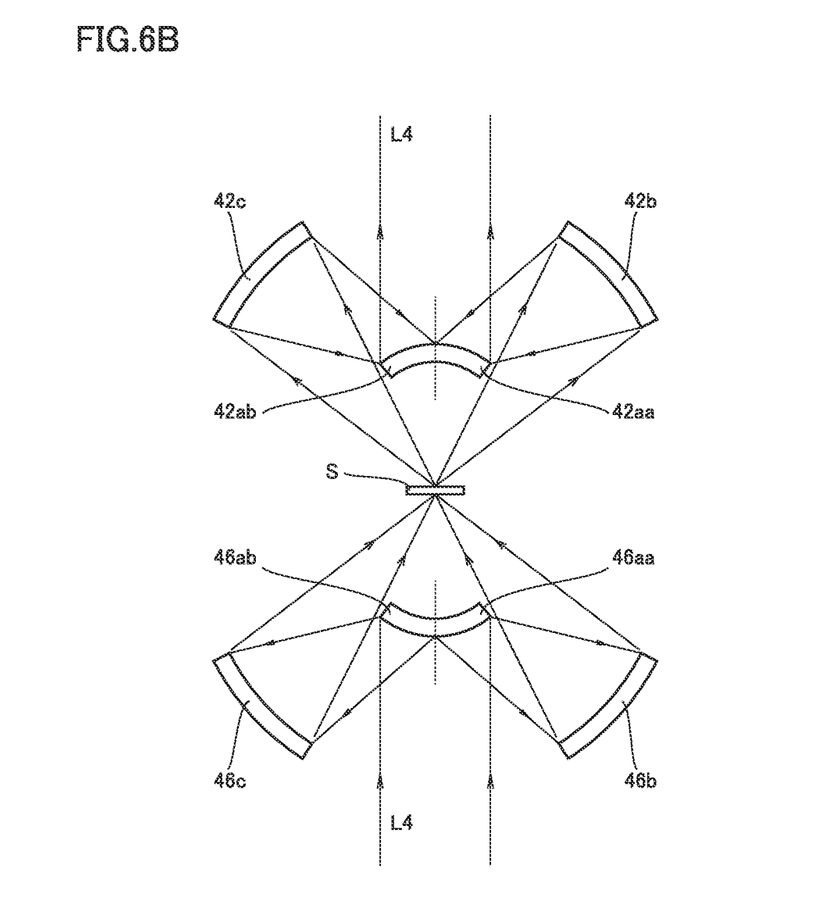
FIG. 6B is a schematic diagram illustrating that second infrared light L4 passes through second observation lens 46 for infrared measurement, a sample S, and first observation lens 42 for infrared measurement.

FIG. 6B is a schematic diagram illustrating that second infrared light L4 passes through second observation lens 46 for infrared measurement, sample S, and first observation lens 42 for infrared measurement. As illustrated in FIG. 6B, a portion of second infrared light L4 entering second observation lens 46 for infrared measurement is reflected by first portion 46aa and further reflected by spherical mirror 46b. Another portion of second infrared light L4 entering second observation lens 46 for infrared measurement is reflected by second portion 46ab and further reflected by spherical mirror 46c. This condenses second infrared light L4 and second infrared light L4 is then radiated to sample S. A portion of second infrared light L4 passing through sample S is sequentially reflected by spherical mirror 42b and first portion 42aa. Similarly, another portion of second infrared light L4 passing through sample S is sequentially reflected by spherical mirror 42c and second portion 42ab. This causes second infrared light L4 passing through sample S to be collimated by passing through first observation lens 42 for infrared measurement.

As illustrated in FIG. 5, second infrared light L4 passing through first observation lens 42 for infrared measurement enters infrared detector 62. This causes infrared detector 62 to perform second infrared measurement. At the time of second infrared measurement, mirror 30 is detached from the optical path of second infrared light L4 passing through first observation lens 42 for infrared measurement. This prevents mirror 30 from influencing second infrared light L4 passing through first observation lens 42 for infrared measurement. In these respects, the configuration of infrared Raman device 100A is different from the configuration of infrared Raman device 100.

<Effect of Infrared Raman Device 100A>

The following describes an effect of infrared Raman device 100A.

In infrared Raman device 100A, the optical axis of second observation lens 46 for infrared measurement coincides with the optical axis of objective lens 41 for Raman measurement at the time of Raman measurement and the optical axis of first observation lens 42 for infrared measurement at the time of first infrared measurement. It is thus unnecessary in infrared Raman device 100A to adjust the position of sample S in switching Raman measurement or first infrared measurement to second infrared measurement. In addition, infrared Raman device 100A does not request an objective optical system for second infrared observation other than second observation lens 46 for infrared measurement. This allows for a decrease in size around the objective optical system even when it is possible to switch and perform not only Raman measurement and first infrared measurement, but also second infrared measurement in which second infrared light L4 is used.

(Supplements)

The embodiments of the present disclosure include the following configurations.

<Supplement 1> An infrared Raman device capable of switching and performing Raman measurement and first infrared measurement on a sample, the infrared Raman device including:
  an objective lens for Raman measurement;
  a first observation lens for infrared measurement;
  a laser light source that generates laser light;
  a first infrared light source that generates first infrared light; and
  a mirror, in which the mirror is disposed at time of the Raman measurement to reflect the laser light to cause the laser light to pass through the objective lens for Raman measurement and reflect Raman light generated from the sample by the laser light that passes through the objective lens for Raman measurement and radiated to the sample, the Raman light passing back through the objective lens for Raman measurement,
  the objective lens for Raman measurement is switched to the first observation lens for infrared measurement at time of the first infrared measurement to cause an optical axis of the first observation lens for infrared measurement to coincide with an optical axis of the objective lens for Raman measurement at the time of the Raman measurement and the first observation lens for infrared measurement is used, and
  the mirror is disposed at the time of the first infrared measurement to partially reflect the first infrared light to cause the first infrared light to pass through the first observation lens for infrared measurement and transmit the first infrared light that is reflected by the sample after passing through the first observation lens for infrared measurement and passes through the first observation lens for infrared measurement again.

<Supplement 2> The infrared Raman device according to Supplement 1, further comprising a revolving nosepiece, in which
  the objective lens for Raman measurement and the first observation lens for infrared measurement are attached to the revolving nosepiece, and
  the objective lens for Raman measurement is switched to the first observation lens for infrared measurement at the time of the first infrared measurement by revolving the revolving nosepiece to cause the optical axis of the first observation lens for infrared measurement to coincide with the optical axis of the objective lens for Raman measurement at the time of the Raman measurement and the first observation lens for infrared measurement is used.

<Supplement 3> The infrared Raman device according to Supplement 1 or 2, in which
  the infrared Raman device is capable of further performing second infrared measurement on the sample by switching to the second infrared measurement,
  the infrared Raman device further includes
    a second observation lens for infrared measurement, and
    a second infrared light source that generates second infrared light,
  an optical axis of the second observation lens for infrared measurement coincides with the optical axis of the first observation lens for infrared measurement at the time of the first infrared measurement, and
  the mirror is detached at time of the second infrared measurement from an optical path of the second infrared light that sequentially passes through the second observation lens for infrared measurement, the sample, and the first observation lens for infrared measurement.

<Supplement 4> The infrared Raman device according to any one of Supplements 1 to 3, in which the mirror is an edge mirror.

Although the embodiments of the present invention have been described, it should be understood that the embodiments disclosed herein are examples in all respects, but should not be taken by way of limitation. The scope of the present invention is defined by the claims. The scope of the present invention is intended to include all modifications within the meaning and the scope equivalent to the claims.

What is claimed is:

1. An infrared Raman device capable of switching and performing Raman measurement and first infrared measurement on a sample, the infrared Raman device comprising:
  an objective lens for Raman measurement;
  a first observation lens for infrared measurement;
  a laser light source that generates laser light;
  a first infrared light source that generates first infrared light; and
  a mirror, wherein
  the mirror is disposed at time of the Raman measurement to reflect the laser light to cause the laser light to pass through the objective lens for Raman measurement and reflect Raman light generated from the sample by the laser light that passes through the objective lens for Raman measurement and radiated to the sample, the Raman light passing back through the objective lens for Raman measurement,
  the objective lens for Raman measurement is switched to the first observation Jens for infrared measurement at time of the first infrared measurement to cause an optical axis of the first observation lens for infrared measurement to coincide with an optical axis of the objective lens for Raman measurement at the time of the Raman measurement and the first observation lens for infrared measurement is used, and the mirror is disposed at the time of the first infrared measurement to partially reflect the first infrared light to cause the first infrared light to pass through the first observation lens for infrared measurement and transmit the first infrared light that is reflected by the sample after passing through the first observation lens for infrared measurement and passes through the first observation lens for infrared measurement again.

2. The infrared Raman device according to claim 1, further comprising a revolving nosepiece, wherein the objective lens for Raman measurement and the first observation lens for infrared measurement are attached to the revolving nosepiece, and the objective lens for Raman measurement is switched to the first observation lens for infrared measurement at the time of the first infrared measurement by revolving the revolving nosepiece to cause the optical axis of the first observation lens for infrared measurement to coincide with the optical axis of the objective lens for Raman measurement at the time of the Raman measurement and the first observation lens for infrared measurement is used.

3. The infrared Raman device according to claim 1, wherein the infrared Raman device is capable of further performing second infrared measurement on the sample by switching to the second infrared measurement, the infrared Raman device further comprises a second observation lens for infrared measurement, and a second infrared light source that generates second infrared light, an optical axis of the second observation lens for infrared measurement coincides with the optical axis of the first observation lens for infrared measurement at the time of the first infrared measurement, and the mirror is detached at time of the second infrared measurement from an optical path of the second infrared light that sequentially passes through the second observation lens for infrared measurement, the sample, and the first observation lens for infrared measurement.

4. The infrared Raman device according to claim 1, wherein the mirror is an edge mirror.

* * * * *